US012637549B2

(12) United States Patent
Watanabe et al.

(10) Patent No.: US 12,637,549 B2
(45) Date of Patent: May 26, 2026

(54) OXYGEN ABSORBING RESIN COMPOSITION, OXYGEN ABSORBING FILM, OXYGEN ABSORBING MULTI-LAYER FILM, AND COVER MATERIAL

(71) Applicant: MITSUBISHI GAS CHEMICAL COMPANY, INC., Tokyo (JP)

(72) Inventors: Keisuke Watanabe, Tokyo (JP); Yoshiki Itou, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 280 days.

(21) Appl. No.: 18/038,751

(22) PCT Filed: Nov. 15, 2021

(86) PCT No.: PCT/JP2021/041963
§ 371 (c)(1),
(2) Date: May 25, 2023

(87) PCT Pub. No.: WO2022/113807
PCT Pub. Date: Jun. 2, 2022

(65) Prior Publication Data
US 2024/0018317 A1 Jan. 18, 2024

(30) Foreign Application Priority Data
Nov. 30, 2020 (JP) ................................ 2020-198649

(51) Int. Cl.
| | |
|---|---|
| *C08J 5/18* | (2006.01) |
| *B32B 15/085* | (2006.01) |
| *B32B 15/20* | (2006.01) |
| *B32B 27/08* | (2006.01) |
| *B32B 27/18* | (2006.01) |
| *B32B 27/30* | (2006.01) |
| *B32B 27/32* | (2006.01) |
| *B32B 27/34* | (2006.01) |
| *B65D 65/40* | (2006.01) |
| *C08K 3/08* | (2006.01) |
| *C08K 3/22* | (2006.01) |

(52) U.S. Cl.
CPC .............. *C08J 5/18* (2013.01); *B32B 15/085* (2013.01); *B32B 15/20* (2013.01); *B32B 27/08* (2013.01); *B32B 27/18* (2013.01); *B32B 27/306* (2013.01); *B32B 27/32* (2013.01); *B32B 27/34* (2013.01); *B65D 65/40* (2013.01); *C08K 3/08* (2013.01); *C08K 3/22* (2013.01); *B32B 2264/1022* (2020.08); *B32B 2264/1056* (2020.08); *B32B 2307/7244* (2013.01); *B32B 2307/74* (2013.01); *B32B 2553/00* (2013.01);

*B65D 2565/387* (2013.01); *C08J 2323/06* (2013.01); *C08K 2003/0856* (2013.01); *C08K 2003/2206* (2013.01); *C08K 2003/2237* (2013.01); *C08K 2201/008* (2013.01); *C08K 2201/012* (2013.01)

(58) Field of Classification Search
None
See application file for complete search history.

(56) References Cited

U.S. PATENT DOCUMENTS

| | | | |
|---|---|---|---|
| 6,063,503 A | 5/2000 | Hatakeyama et al. | |
| 6,391,407 B1* | 5/2002 | Kashiba ................. | B32B 27/08 |
| | | | 428/35.9 |
| 2014/0291178 A1* | 10/2014 | Masuda ................. | B32B 27/08 |
| | | | 523/218 |
| 2019/0099738 A1 | 4/2019 | Kawai et al. | |

FOREIGN PATENT DOCUMENTS

| | | | |
|---|---|---|---|
| CN | 108697972 | | 10/2018 |
| JP | 09-234832 A | | 9/1997 |
| JP | 09-278024 A | | 10/1997 |
| JP | 2000-212450 | | 8/2000 |
| JP | 2001-121652 A | | 5/2001 |
| JP | 2002-103490 A | | 4/2002 |
| JP | 2003335367 A | * | 11/2003 |
| JP | 2004-315035 A | | 11/2004 |
| JP | 2005-60494 | | 3/2005 |
| JP | 2005-104064 A | | 4/2005 |
| JP | 2015007148 A | * | 1/2015 |

OTHER PUBLICATIONS 2003-335367 (Year: 2003).*
2015-007148 (Year: 2015).*
International Search Report issued Jan. 25, 2023 in International Bureau of WIPO Patent Application No. PCT/JP2021/041963, along with an English translation thereof.
Written Opinion issued Jan. 25, 2023 in International Bureau of Wipo Patent Application No. PCT/JP2021/041963, along with an English translation thereof.

* cited by examiner

*Primary Examiner* — Samir Shah
(74) *Attorney, Agent, or Firm* — Greenblum & Bernstein, P.L.C.

(57) ABSTRACT

An oxygen absorbing resin composition containing a polyolefin, an iron powder, titanium oxide, and calcium oxide, a content of the iron powder being from 10 to 50 mass % in the oxygen absorbing resin composition, a mass ratio of the titanium oxide to the iron powder [titanium oxide/iron powder] being from 0.1 to 0.5, and a mass ratio of the calcium oxide to the iron powder [calcium oxide/iron powder] being from 0.1 to 0.5.

13 Claims, No Drawings

OXYGEN ABSORBING RESIN COMPOSITION, OXYGEN ABSORBING FILM, OXYGEN ABSORBING MULTI-LAYER FILM, AND COVER MATERIAL

TECHNICAL FIELD

The present invention relates to an oxygen absorbing resin composition, an oxygen absorbing film, an oxygen absorbing multi-layer film, and a cover material.

BACKGROUND ART

As a packaging material for foods and the like having a yearly-based long shelf life, can has been used. In the case where foods and the like are stored by can, the can can exhibit a potent effect for various gas barrier properties against oxygen, water vapor and the like, but has some problems in that the canned products could not be heated in a microwave oven, that the canned foods are difficult to take out when they are put in serving dishes or the like, and that the used cans could not be piled up for disposal after use and are therefore kept voluminous, that is, the can lacks in disposal aptitude.

Given the situation, application of plastic containers has become investigated also to the above-mentioned packaging containers that are required to have a long shelf life.

As one example, a packaging container made as a multi-layer material container prepared by providing a deoxygenating resin layer containing a deoxidant composition incorporated therein around an already-existing gas barrier container has been developed, in which the gas barrier performance of the container is improved and a deoxygenation function is imparted to the container itself.

For example, Patent Document 1 describes a deoxygenating cover material including, sequentially, a gas barrier layer, an oxygen absorbing layer containing an oxygen absorbing resin composition produced by blending an iron-based oxygen absorbing agent in a thermoplastic resin, and a heat seal layer containing a heat seal resin, a density of the heat seal resin being 0.930 g/cm$^3$ or more, to provide a deoxygenating cover material that can be used for a molded container with gas barrier properties, that achieves excellent cutting after sealing, and that achieves excellent appearance also after opening.

CITATION LIST

Patent Document

Patent Document 1: JP 2004-315035 A

SUMMARY OF INVENTION

Technical Problem

As described in Patent Document 1, iron powder has been widely used as an oxygen absorbing agent for a packaging material having deoxygenating properties. However, when a large amount of iron powder is blended in a resin to impart an oxygen absorption property, appearance may deteriorate, or clear printing may not be performed. In addition, a bad odor may occur when iron powder is kneaded in a resin and when a packaging is heated.

Thus, a resin material and a resin film that can be used as packaging materials having excellent light blocking property and odor suppressing performance while excellent oxygen absorption property of iron powder is maintained has been demanded.

An object of the present invention is to provide an oxygen absorbing resin composition having excellent oxygen absorption property and excellent light blocking property and odor suppressing performance, and an oxygen absorbing film.

Solution to Problem

The present invention is as follows.

<1> An oxygen absorbing resin composition containing:
a polyolefin;
an iron powder;
titanium oxide; and
calcium oxide,
a content of the iron powder being from 10 to 50 mass % in the oxygen absorbing resin composition,
a mass ratio of the titanium oxide to the iron powder [titanium oxide/iron powder] being from 0.1 to 0.5, and
a mass ratio of the calcium oxide to the iron powder [calcium oxide/iron powder] being from 0.1 to 0.5.

<2> The oxygen absorbing resin composition according to <1> above, where the mass ratio of the titanium oxide to the iron powder [titanium oxide/iron powder] is from 0.15 to 0.5.

<3> The oxygen absorbing resin composition according to <1> or <2> above, where a mass ratio of the calcium oxide to the titanium oxide [calcium oxide/titanium oxide] is from 0.6 to 1.5.

<4> The oxygen absorbing resin composition according to any one of <1> to <3> above, where a content of the titanium oxide is from 1 to 15 mass % in the oxygen absorbing resin composition.

<5> The oxygen absorbing resin composition according to any one of <1> to <4> above, where a content of the calcium oxide is from 1 to 15 mass % in the oxygen absorbing resin composition.

<6> An oxygen absorbing film containing the oxygen absorbing resin composition according to any one of <1> to <5> above.

<7> An oxygen absorbing multi-layer film containing the oxygen absorbing film according to <6> above as an oxygen absorbing layer.

<8> The oxygen absorbing multi-layer film according to <7> above, comprising a multi-layer structure including a layer containing a polyolefin as a main component, an oxygen absorbing layer, and a gas barrier layer layered in this order.

<9> The oxygen absorbing multi-layer film according to <7> or <8> above, where a thickness of the oxygen absorbing layer is from 10 to 200 μm.

<10> The oxygen absorbing multi-layer film according to <8> or <9> above, where the gas barrier layer is a layer containing at least one selected from the group consisting of thin metal films, inorganic vapor-deposited films, ethylene-vinyl alcohol copolymers, and polyamide resins.

<11> The oxygen absorbing multi-layer film according to any one of <7> to <10> above, where the titanium oxide is only contained in the oxygen absorbing layer.

<12> A cover material including the oxygen absorbing multi-layer film according to any one of <7> to <11> above.

Note that, in the present description, the expression of "containing . . . as a main component" means that it contains the component in an amount of preferably 90 mass % or more, more preferably 95 mass % or more, even more preferably 98 mass % or more, and may contain any other component within a range not detracting from the advantageous effects of the present invention.

Advantageous Effects of Invention

The oxygen absorbing resin composition of the present invention has excellent oxygen absorption property and excellent light blocking property and odor suppressing performance.

DESCRIPTION OF EMBODIMENTS

An embodiment according to the present invention will be described below. The content of the present invention is not limited to the embodiment described below.

Note that in the present specification, a phrase of "A to B" indicating a numerical range means "greater than or equal to A and less than or equal to B" (in the case of A<B), or "less than or equal to A and greater than or equal to B" (in the case of A>B). Furthermore, in the present invention, a combination of preferable aspects is a more preferable aspect.

Oxygen Absorbing Resin Composition

The oxygen absorbing resin composition of the present invention contains a polyolefin, an iron powder, titanium oxide, and calcium oxide. A content of the iron powder is from 10 to 50 mass % in the oxygen absorbing resin composition, a mass ratio of the titanium oxide to the iron powder [titanium oxide/iron powder] is from 0.1 to 0.5, and a mass ratio of the calcium oxide to the iron powder [calcium oxide/iron powder] is from 0.1 to 0.5.

The oxygen absorbing resin composition of the present invention has excellent oxygen absorption property and excellent light blocking property and odor suppressing performance due to the constitution described above.

Although iron powder has a high oxygen absorbing performance, the iron powder tends to turn into black or brown and also relates to decomposition and the like of a resin. Thus, when the iron powder is used for a packaging material such as a cover material, printability decreases and a bad odor is generated. Titanium oxide may be added to improve printability and to enhance appearance, or calcium oxide may be added to suppress a bad odor; however, the titanium oxide and the calcium oxide negatively affect oxygen absorption property and the like. For the present invention, it was found that, in the case where these are contained in a polyolefin in a specific ratio, the light blocking property and odor suppressing performance can be enhanced while the oxygen absorption property is maintained or further improved. Thus, an oxygen absorbing resin composition that is useful as a packaging material, especially as a raw material for a cover material, as described below is produced.

Polyolefin

Examples of the polyolefin used in the oxygen absorbing resin composition of the present invention include: polyolefins such as a polyethylene, polypropylene, polybutene, polybutadiene, polymethylpentene, ethylene-propylene copolymer, and propylene-ethylene block copolymer; polyolefin copolymers such as an ethylene-vinyl acetate copolymer, ethylene-acrylic acid copolymer, ethylene-acrylate copolymer, ethylene-methacrylic acid copolymer, and ethylene-methacrylate copolymer; and graft polymers of the above-mentioned polyolefin or the above-mentioned polyolefin copolymer and silicone resin. Among these, the polyolefin is preferably polyolefin, more preferably at least one selected from the group consisting of polyethylene, polypropylene, and ethylene-propylene copolymers, even more preferably at least one selected from the group consisting of polyethylene and polypropylene, and yet even more preferably polyethylene. From a viewpoints of gas permeability, among the polyethylene, a low density polyethylene is preferred, and a linear low density polyethylene is more preferred.

The polyolefin may be used alone, or two or more types may be used in combination.

Iron Powder

The iron powder used in the oxygen absorbing resin composition of the present invention is not particularly limited as long as the iron powder is dispersible in a resin and is able to induce a deoxidation reaction, and iron powder typically used as a deoxidant can be used. Specific examples of the iron powder include reduced iron powder, sponge iron powder, sprayed iron powder, iron grinding powder, electrolytic iron powder, and crushed iron. Furthermore, iron powder containing less oxygen, silicon, and the like as impurities is preferred, and iron powder having a metal iron content of 95 mass % or more is particularly preferred.

The content of the iron powder in the oxygen absorbing resin composition is from 10 to 50 mass %, preferably from 10 to 40 mass %, more preferably from 10 to 30 mass %, even more preferably from 15 to 25 mass %, and yet even more preferably from 18 to 25 mass %, in the oxygen absorbing resin composition. When the content is in this range, a good deoxygenating performance can be exhibited without negatively affecting appearance.

From a viewpoint of deoxygenating performance, the iron powder is preferably used as a deoxidant composition containing the iron powder and a metal halide. The metal halide enhances the oxygen absorption performance by catalytic action for an oxygen absorption reaction of metal iron.

Specific preferred examples of the metal in the metal halide include at least one type selected from the group consisting of alkali metals, alkaline earth metals, copper, zinc, aluminum, tin, iron, cobalt, and nickel. In particular, lithium, potassium, sodium, magnesium, calcium, barium, and iron are preferred. Furthermore, specific preferred examples of the halide include chlorides, bromides, and iodides, and chlorides are particularly preferred.

The blended amount of the metal halide is preferably from 0.1 to 20 parts by mass with respect to 100 parts by mass of the iron powder. It is preferable that substantially all of the metal of the metal halide adhere to the iron powder and that there be few metal halides that are free in the deoxidant composition, and when the metal halide acts effectively, the amount is more preferably from 0.1 to 5 parts by mass with respect to 100 parts by mass of the iron powder.

In the present invention, the iron powder is preferably used as a deoxidant composition in which metal halide is adhered to the iron powder, and is more preferably used as a deoxidant composition in which a surface of the iron powder is coated with the metal halide.

Preferably, the metal halide is added according to a method where it does not easily separate from metal iron, and for example, a method of burying metal halide microparticles in the surface of iron powder by grinding and mixing them using a ball mill, a speed mill, or the like; a method of adhering metal halide microparticles to the surface of iron powder using a binder; and a method of mixing an aqueous solution of a metal halide and iron powder and drying the resultant mixture so as to adhere metal halide microparticles to the surface of iron powder are preferred. In particular, the deoxidant composition is preferably prepared by mixing an aqueous solution of a metal halide into iron powder and then drying to remove water.

The water content of the deoxidant composition is preferably small, and the water content of the deoxidant composition is preferably 0.2 mass % or less, and more preferably 0.1 mass % or less. When the deoxidant composition exhibits an oxygen absorption function with water content at the time when the deoxidant composition is used as the resin composition of the present invention.

The mean particle size of the iron powder is 1 μm or more and less than 100 μm, preferably 1 μm or more and less than 80 μm, more preferably 1 μm or more and less than 50 μm, and even more preferably 1 μm or more and less than 40 μm.

Furthermore, the maximum particle size of the iron powder is preferably 150 μm or less, more preferably 100 μm or less, even more preferably 80 μm or less, and yet even more preferably 70 μm or less.

When the particle size of the iron powder is in the range above, adequate deoxygenating properties can be exhibited with only a small amount of the iron powder. Furthermore, because the iron powder has a small particle size and has excellent deoxygenating properties, an oxygen absorbing layer containing the iron powder can be made thin when the oxygen absorbing resin composition is used for a multi-layer film described below, and also excellent appearance is achieved.

The mean particle size and the maximum particle size of the iron powder can be measured by a particle size measurement instrument, such as a laser diffraction type particle size distribution analyzer "LMS-2000e (trade name)" (available from Seishin Enterprise Co., Ltd.).

Titanium Oxide

The titanium oxide used in the oxygen absorbing resin composition of the present invention can achieve good appearance and improve printability because the color turns into white in addition to the titanium oxide imparting a light blocking property and concealing property to the resin composition and film.

The titanium oxide is not particularly limited but is preferably white titanium dioxide ($TiO_2$). The crystal structure of the titanium oxide is not particularly limited, and both of rutile type and anatase type can be used, but the crystal structure is preferably a rutile structure.

From viewpoints of improving affinity of components constituting the oxygen absorbing resin composition of the present invention and dispersing uniformly, a material that has undergone surface treatment by a silane coupling agent and the like may be used as the titanium oxide.

The mean particle size of the titanium oxide is preferably from 0.01 to 10 μm, more preferably from 0.1 to 8 μm, and even more preferably from 0.2 to 5 μm.

The mean particle size of the titanium oxide can be measured by a particle size measurement instrument, such as a laser diffraction type particle size distribution analyzer (same as described above).

The content of the titanium oxide in the oxygen absorbing resin composition is preferably from 1 to 15 mass %, more preferably from 2 to 10 mass %, and even more preferably from 4 to 7 mass %, in the oxygen absorbing resin composition.

From the perspective of uniformly dispersing the titanium oxide in the resin composition of the present invention, the titanium oxide is preferably used as a master batch containing the titanium oxide and a resin. The resin to be contained in the master batch is only required to be a thermoplastic resin but is particularly preferably a polyolefin from a viewpoint of compatibility with the polyolefin constituting the resin composition of the present invention. Examples thereof include: polyethylene such as low density polyethylene, medium density polyethylene, high density polyethylene, and linear low density polyethylene; polypropylene such as propylene homopolymers, ethylene-propylene block copolymers, and ethylene-propylene random copolymers; homopolymers of ethylene-based hydrocarbon having 2 or more carbons such as 1-polybutene and 1-polymethylpentene; homopolymers of α-olefin having from 3 to 20 carbons; copolymers of α-olefin having from 3 to 20 carbons; and copolymers of α-olefin having from 3 to 20 carbons and cyclic olefin.

The content of the titanium oxide in the master batch is preferably from 30 to 90 mass %, more preferably from 40 to 80 mass %, and even more preferably from 50 to 70 mass %.

Calcium Oxide

The calcium oxide used in the oxygen absorbing resin composition of the present invention can reduce odor generated during production and use of the resin composition and film without affecting the oxygen absorption property and the light blocking property.

The mean particle size of the calcium oxide is preferably from 0.1 to 20 μm, and more preferably from 1 to 10 μm.

The mean particle size of the calcium oxide can be measured by a particle size measurement instrument, such as a laser diffraction type particle size distribution analyzer (same as described above).

The content of the calcium oxide in the oxygen absorbing resin composition is preferably from 0.5 to 15 mass %, more preferably from 1 to 15 mass %, even more preferably from 1 to 10 mass %, yet even more preferably from 2 to 9 mass %, and particularly preferably from 5 to 8 mass %, in the oxygen absorbing resin composition.

From the perspective of uniformly dispersing the calcium oxide in the resin composition of the present invention, the calcium oxide is preferably used as a master batch containing the calcium oxide and a resin. The resin to be contained in the master batch is only required to be a thermoplastic resin but is particularly preferably a polyolefin from a viewpoint of compatibility with the polyolefin constituting the resin composition of the present invention. Examples thereof include: polyethylene such as low density polyethylene, medium density polyethylene, high density polyethylene, and linear low density polyethylene; polypropylene such as propylene homopolymers, ethylene-propylene block copolymers, and ethylene-propylene random copolymers; homopolymers of ethylene-based hydrocarbon having 2 or more carbons such as 1-polybutene and 1-polymethylpentene; homopolymers of α-olefin having from 3 to 20 carbons; copolymers of α-olefin having from 3 to 20 carbons; and copolymers of α-olefin having from 3 to 20 carbons and cyclic olefin.

The content of the calcium oxide in the master batch is preferably from 35 to 90 mass %, more preferably from 45 to 85 mass %, and even more preferably from 55 to 75 mass %.

Composition, Production Method, Use, and the Like of Oxygen Absorbing Resin Composition The oxygen absorbing resin composition of the present invention contains the polyolefin, the iron powder, the titanium oxide, and the calcium oxide described above, and these are preferably contained in the following ratio.

The mass ratio of the titanium oxide to the iron powder [titanium oxide/iron powder] is from to 0.5, and from the viewpoints of the oxygen absorption performance and the light blocking property, the mass ratio is preferably from 0.15 to 0.5, more preferably from 0.15 to 0.4, and even more preferably from 0.2 to 0.3.

The mass ratio of the calcium oxide to the iron powder [calcium oxide/iron powder] is from to 0.5, and from the viewpoints of the oxygen absorption performance and the odor suppressing performance, the mass ratio is preferably from 0.1 to 0.45, more preferably from 0.15 to 0.45, even more preferably from 0.2 to 0.4, yet even more preferably from 0.25 to 0.4, and yet even more preferably from 0.25 to 0.35.

The mass ratio of the calcium oxide to the titanium oxide [calcium oxide/titanium oxide] is preferably from 0.4 to 1.6, more preferably from 0.6 to 1.5, and even more preferably from 1.0 to 1.5.

The oxygen absorbing resin composition of the present invention may be produced by any production method, but the oxygen absorbing resin composition is preferably produced by melt-kneading master batches each described in the sections of "Titanium Oxide" and "Calcium Oxide" above and the iron powder and the polyolefin.

Note that the iron powder is preferably used as the deoxidant composition containing the metal halide described above.

To uniformly disperse each component in the composition and to allow easy adjustment of concentrations of components based on the use, the oxygen absorbing resin composition is more preferably produced by melt-kneading master batches each described in the sections of "Titanium Oxide" and "Calcium Oxide" above and the iron powder and some of the polyolefin to prepare an oxygen absorbing resin master batch, and further melt-kneading the oxygen absorbing resin master batch with the rest of the polyolefin based on the use.

The content of the polyolefin in the oxygen absorbing resin master batch is preferably from to 50 parts by mass, more preferably from 15 to 40 parts by mass, and even more preferably from 20 to 30 parts by mass, with respect to 100 parts by mass of all the polyolefins in the oxygen absorbing resin composition of the present invention. Note that the content of the polyolefin in the oxygen absorbing resin master batch also includes the polyolefin contained in the master batch of the titanium oxide and the master batch of the calcium oxide.

The oxygen absorbing resin composition has excellent oxygen absorption property and excellent light blocking property and odor suppressing performance, and thus is suitably used for a packaging container.

When the resin composition is used for a packaging container, the resin composition may be used as a packaging container by molding the resin composition into a film or the like as it is, but is preferably used as a packaging container having a multi-layer structure by forming the multi-layer structure with another resin or resin composition.

Examples of a form of a packaging container for which the oxygen absorbing resin composition of the present invention is suitable include pouches, cover materials for containers, trays, cups, laminate tube containers, bottles, and blister containers. Among these, pouches, cover materials for containers, and trays are preferred, and cover materials for containers are more preferred.

Among the forms of packaging containers, for example, pouches, cover materials, and laminate tubes are made of films or multi-layer films, and it is preferable to use an oxygen absorbing film or oxygen absorbing multi-layer film containing the oxygen absorbing resin composition of the present invention. Preferred oxygen absorbing films and oxygen absorbing multi-layer films will be described below.

Among the forms of packaging containers, a tray is preferably an oxygen absorbing multi-layer tray having a multi-layer structure, and the oxygen absorbing multi-layer tray preferably has a layer containing a first polyolefin as a main component, an oxygen absorbing layer, a gas barrier layer, and a protective layer.

Each layer is preferably formed by using raw materials described in the sections of "Layer Containing Polyolefin as Main Component", "Oxygen Absorbing Layer", "Gas Barrier Layer", and "Protective Layer" in the "Oxygen Absorbing Multi-Layer Film" below.

Because the packaging container using the oxygen absorbing resin composition of the present invention has excellent oxygen absorption property and excellent light blocking property and odor suppressing performance, the packaging container is suitable for packaging various articles but, in particular, suitable for packaging food.

Examples of the articles to be stored in the packaging container using the oxygen absorbing resin composition of the present invention include: beverages, such as milk, milk products, juice, coffee, tea beverages, and alcohol beverages; liquid seasonings, such as Worcester sauce, soy sauce, and dressing; cooked foods, such as soup, stew, curry, infant cooked foods, and nursing care cooked foods; paste foods, such as jam, mayonnaise, ketchup, and jelly; processed seafood, such as tuna and other seafood; processed milk products, such as cheese and butter; processed meat products, such as dressed meat, salami, sausage, and ham; vegetables, such as carrot and potato; egg; noodles; processed rice products, such as uncooked rice, cooked rice, and rice porridge; and dry foods, such as powder seasonings, powder coffee, infant powder milk, powder diet foods, dried vegetables, and rice crackers.

Oxygen Absorbing Film

The oxygen absorbing film of the present invention is made of the oxygen absorbing resin composition. That is, the oxygen absorbing film of the present invention is made of the oxygen absorbing resin composition containing a polyolefin, an iron powder, titanium oxide, and calcium oxide, a content of the iron powder being from 10 to 50 mass % in the oxygen absorbing resin composition, a mass ratio of the titanium oxide to the iron powder [titanium oxide/iron powder] being from 0.1 to 0.5, and a mass ratio of the calcium oxide to the iron powder [calcium oxide/iron powder] being from 0.1 to 0.5.

In the oxygen absorbing film of the present invention, the components and ratios are the same as those described in the section of "Oxygen Absorbing Resin Composition" above.

The thickness of the oxygen absorbing film of the present invention is preferably from 10 to 200 μm, more preferably from 10 to 150 μm, even more preferably from 20 to 150 μm, yet even more preferably from 20 to 100 μm, and yet even more preferably from 20 to 50 μm.

When the thickness of the oxygen absorbing layer is in the range above, excellent balance of oxygen absorption property, light blocking property, and odor suppressing performance is achieved.

The oxygen absorbing film of the present invention can be produced by a method such as press molding, extrusion molding using an extruder and a T-die, and calendar molding. Furthermore, stretching treatment may be performed appropriately.

Note that the oxygen absorbing multi-layer film described below includes the oxygen absorbing film as an oxygen absorbing layer, and in the case where an oxygen absorbing layer of a multi-layer film is formed, molding may be performed simultaneously with another layer.

Oxygen Absorbing Multi-Layer Film

The oxygen absorbing multi-layer film of the present invention includes the oxygen absorbing film as an oxygen absorbing layer.

That is, the oxygen absorbing multi-layer film of the present invention contains, as an oxygen absorbing layer, an oxygen absorbing film made of an oxygen absorbing resin composition, the oxygen absorbing resin composition containing a polyolefin, an iron powder, titanium oxide, and calcium oxide, a content of the iron powder being from 10 to 50 mass % in the oxygen absorbing resin composition, a mass ratio of the titanium oxide to the iron powder [titanium oxide/iron powder] being from 0.1 to 0.5, and a mass ratio of the calcium oxide to the iron powder [calcium oxide/iron powder] being from 0.1 to 0.5.

The oxygen absorbing multi-layer film of the present invention preferably has a multi-layer structure including a layer containing a polyolefin as a main component, an oxygen absorbing layer, and a gas barrier layer layered in this order.

Layer Containing Polyolefin as Main Component

In the case where the oxygen absorbing multi-layer film of the present invention is used in a packaging container or a cover material, the layer containing a polyolefin as a main component is preferably in contact with a space inside of the container or contents in the container.

The layer containing the polyolefin as the main component plays a role of an isolation layer of preventing direct contact between the contents in the container and the adjacent oxygen absorbing layer, and additionally plays a role of allowing rapid and efficient permeation of oxygen inside the container in a manner that the oxygen absorbing layer can adequately exhibit the oxygen absorbing function thereof.

The layer containing the polyolefin as the main component contains a polyolefin as a main component.

Examples of the polyolefin include: polyolefins such as a polyethylene, polypropylene, polybutene, polybutadiene, polymethylpentene, ethylene-propylene copolymer, and propylene-ethylene block copolymer; polyolefin copolymers such as an ethylene-vinyl acetate copolymer, ethylene-acrylic acid copolymer, ethylene-acrylate copolymer, ethylene-methacrylic acid copolymer, and ethylene-methacrylate copolymer; and graft polymers of the above-mentioned polyolefin or the above-mentioned polyolefin copolymer and silicone resin. Among these, the polyolefin is preferably polyolefin, more preferably at least one selected from the group consisting of polyethylene, polypropylene, and ethylene-propylene copolymers, even more preferably at least one selected from the group consisting of polyethylene and polypropylene, and yet even more preferably polyethylene. One type of these may be used alone, or two or more types of these may be used in combination.

Furthermore, the polyolefin preferably has compatibility with the oxygen absorbing resin composition used in the oxygen absorbing layer. By choosing resins with compatibility, the resin of this layer containing the polyolefin as the main component and the resin of the oxygen absorbing layer can be co-extruded and thus layered and adhered.

When the oxygen absorbing multi-layer film is used for a packaging container, the layer containing the polyolefin as the main component often plays a role of a sealant layer as an innermost layer (layer that is in contact with an inner part of the packaging container) of the oxygen absorbing multi-layer film. Thus, a heat sealable resin is preferably selected. Alternatively, a heat seal layer may be further provided in an inner face side. Note that, for the resin constituting the innermost layer, as necessary, additives such as colorants, fillers, antistatic agents, and stabilizers can be blended.

The layer containing the polyolefin as the main component is required to play a role of an isolation layer between the contents in the container and the oxygen absorbing layer as described above and, additionally, play a role of allowing rapid and efficient permeation of oxygen inside the container. Consequently, irrespective of the presence or absence of any other layer such as the above-mentioned heat seal layer or the like and irrespective of the layer thickness of this layer itself, it is preferable that the oxygen permeability of this layer be at least 100 mL/m$^2$·day·atm (23° C., 100% RH) or more.

The thickness of the layer containing the polyolefin as the main component is preferably from 10 to 200 μm, more preferably from 20 to 100 μm, even more preferably from 30 to 80 μm, and even more preferably from 40 to 60 μm, from viewpoints of moldability and oxygen permeability.

Oxygen Absorbing Layer

The oxygen absorbing layer is the oxygen absorbing film described above. That is, the oxygen absorbing layer is made of the oxygen absorbing resin composition containing a polyolefin, an iron powder, titanium oxide, and calcium oxide, a content of the iron powder being from 10 to mass % in the oxygen absorbing resin composition, a mass ratio of the titanium oxide to the iron powder [titanium oxide/iron powder] being from 0.1 to 0.5, and a mass ratio of the calcium oxide to the iron powder [calcium oxide/iron powder] being from 0.1 to 0.5. Thus, the oxygen absorbing layer preferably contains the components in the ratios described in the section of "Oxygen Absorbing Resin Composition" above.

The oxygen absorbing layer contains titanium oxide as described above but, in the oxygen absorbing multi-layer film of the present invention, the titanium oxide is preferably contained only in the oxygen absorbing layer.

The preferred thickness of the oxygen absorbing layer is the same as the thickness of the oxygen absorbing film and is preferably from 10 to 200 μm, more preferably from 10 to 150 μm, even more preferably from 20 to 150 μm, yet even more preferably from 20 to 100 μm, and yet even more preferably from 20 to 50 μm.

When the thickness of the oxygen absorbing layer is in the range above, excellent balance of oxygen absorption property, light blocking property, and odor suppressing performance is achieved.

Gas Barrier Layer

In the case where the oxygen absorbing multi-layer film of the present invention is used as a packaging container or a cover material, the gas barrier layer plays a role of blocking oxygen from penetrating from outside.

The gas barrier layer constitution may be one layer or two or more layers in the oxygen absorbing multi-layer film based on the purpose thereof. By providing two or more layers, permeation of oxygen from outside can be more efficiently suppressed.

The gas barrier layer is preferably a layer containing at least one selected from the group consisting of thin metal films, inorganic vapor-deposited films, and gas barrier resins such as ethylene-vinyl alcohol copolymers and polyamide resins, more preferably a layer containing at least one selected from the group consisting of ethylene-vinyl alcohol copolymers and polyamide resins from the viewpoints of ease in molding and design in addition to gas barrier properties, and even more preferably a polyamide resin.

Examples of the thin metal film include thin aluminum films.

Examples of the inorganic vapor-deposited film include films produced by depositing silica, alumina, or aluminum on an adjacent layer.

The ethylene-vinyl alcohol copolymer is a polymer produced by saponifying an ethylene-vinyl ester copolymer. Among these, an ethylene-vinyl alcohol copolymer having an ethylene content of 5 to 60 mol % and a degree of saponification of 85% or more is preferred. The ethylene content of the ethylene-vinyl alcohol copolymer is preferably 20 mol % or more, and more preferably 25 mol % or more. Furthermore, the ethylene content is preferably 55 mol % or less, and more preferably 50 mol % or less. The degree of saponification of the vinyl ester component is preferably 85% or more, more preferably 90% or more, and even more preferably 99% or more.

Examples of the polyamide resin include aliphatic polyamides and semiaromatic polyamides, and an aliphatic polyamide is preferred from a viewpoint of impact strength.

Examples of the aliphatic polyamide include nylon 6, nylon 6,6, and nylon 6,12, and nylon 6 and nylon 6,6 are preferred.

As the semiaromatic polyamide, a polyamide resin (X) containing a diamine unit including an m-xylylenediamine unit and a dicarboxylic acid unit including a linear aliphatic dicarboxylic acid unit is preferred.

From a viewpoint of exhibiting excellent gas barrier properties, the diamine units of the polyamide resin (X) contain preferably 70 mol % or more, more preferably from 80 to 100 mol %, and even more preferably from 90 to 100 mol %, of the m-xylylenediamine units.

Examples of a compound that can constitute the diamine unit besides the m-xylylenediamine unit include, but not limited to, aromatic diamines such as p-xylylenediamine, alicyclic diamines such as 1,3-bis(aminomethyl)cyclohexane and 1,4-bis(aminomethyl)cyclohexane, and linear or branched aliphatic diamines such as tetramethylenediamine, hexamethylenediamine, nonamethylenediamine, and 2-methyl-1,5-pentanediamine.

The dicarboxylic acid units in the polyamide resin (X) preferably include 70 mol % or more of α,ω-linear aliphatic dicarboxylic acid units having from 4 to 20 carbons.

Among the dicarboxylic acid units, the content of the α,ω-linear aliphatic dicarboxylic acid units having from 4 to 20 carbons is more preferably 85 mol % or more, even more preferably 88 mol % or more, and yet even more preferably 90 mol % or more, and 100 mol % or less.

Furthermore, from a viewpoint of moldability, the dicarboxylic acid units in the polyamide resin (X) preferably include aromatic dicarboxylic acid units.

When the dicarboxylic acid units in the polyamide resin (X) include the α,ω-linear aliphatic dicarboxylic acid units having from 4 to 20 carbons and the aromatic dicarboxylic acid units, the content of the α,ω-linear aliphatic dicarboxylic acid units having from 4 to 20 carbons is preferably from 85 to 96 mol %, more preferably from 88 to 96 mol %, and even more preferably from 90 to 94 mol %.

Furthermore, the content of the aromatic dicarboxylic acid units is preferably from 4 to 15 mol %, more preferably from 4 to 12 mol %, and even more preferably from 6 to 10 mol %.

By allowing 85 mol % or more of the α,ω-linear aliphatic dicarboxylic acid units having from 4 to 20 carbons to be contained among the dicarboxylic acid units, lowering of gas barrier properties and excessive lowering of crystallinity can be avoided. Furthermore, by allowing 4 mol % or more of the aromatic dicarboxylic acid units to be contained, the amorphousness of the polyamide resin (X) increases and the crystallization rate thereof lowers, and therefore good thermoformability during film formation is achieved.

Examples of a compound that can constitute the α,ω-linear aliphatic dicarboxylic acid unit having from 4 to 20 carbons include, but not limited to, succinic acid, glutaric acid, adipic acid, pimelic acid, suberic acid, azelaic acid, sebacic acid, 1,10-decanedicarboxylic acid, 1,11-undecanedicarboxylic acid, and 1,12-dodecanedicarboxylic acid. One of these can be used alone, or two or more types can be used in combination. Among these, adipic acid is preferred.

Examples of a compound that can constitute the aromatic dicarboxylic acid unit include, but not limited to, terephthalic acid, isophthalic acid, and 2,6-naphthalenedicarboxylic acid. One of these can be used alone, or two or more types can be used in combination. Among these, from viewpoints of sublimation characteristics, ease in obtaining, and the like, isophthalic acid is preferred.

The polyamide resin (X) can be produced by subjecting the diamine component containing m-xylylenediamine and the dicarboxylic acid component containing an α,ω-linear aliphatic dicarboxylic acid having from 4 to 20 carbons to polycondensation. During the polycondensation, a small amount of monoamine or monocarboxylic acid may be added as a molecular weight modifier.

The polyamide resin (X) is preferably a material produced by performing polycondensation by a melt polymerization method and then performing solid-phase polymerization. Examples of the melt polycondensation method include a method in which a nylon salt composed of a diamine and a dicarboxylic acid is subjected to a temperature increase under increased pressure in the presence of water, and is polymerized in a molten state while the added water and condensed water are removed. In addition, another example is a method in which a diamine component is added directly to a molten dicarboxylic acid component and then subjected to polycondensation. In this case, in order to maintain the reaction system in a uniform liquid state, the diamine component is continuously added to the dicarboxylic acid component, and during this time, polycondensation is allowed to proceed while the temperature of the reaction system is raised such that the reaction temperature does not fall below the melting points of the produced oligoamide and polyamide resin.

Preferably, the solid-phase polymerization is carried out after the polymer produced in melt polycondensation has been once taken out. As a heating device to be used in solid-phase polymerization, a batch-type heating device excellent in airtightness and capable of highly preventing contact between oxygen and polyamide resin is preferred to a continuous heating device, and in particular, a rotary drum-type heating device called a tumble dryer, a conical dryer, or a rotary dryer, and a cone-shaped heating device equipped with a rotary blade inside it, called a Nauta mixer, may be favorably used. However, the heating device is not limited to these.

The solid-phase polymerization process for the polyamide resin preferably includes, for example, for the purpose of preventing the polyamide resin pellets from fusing together and preventing the polyamide resin pellets from adhering to the inner wall of devices, a first step for increasing the degree of crystallinity of the polyamide resin, a second step of increasing the molecular weight of the polyamide resin, and a third step of cooling the polyamide resin after the solid-phase polymerization has been promoted to give a desired molecular weight of the resin. Preferably, the first step is carried out at a temperature not higher than the glass transition temperature of the polyamide resin. Preferably, the second step is carried out at a temperature lower than the melting point of the polyamide resin under reduced pressure, but is not limited thereto.

When the gas barrier layer is made of a gas barrier resin, any optional additives such as lubricants, delustering agents, heat-resistant stabilizers, weather-resistant stabilizers, UV absorbents, crystallization nucleating agents, plasticizers, flame retardants, antistatic agents, coloration inhibitors, and gelling inhibitors may be contained within a range not detracting from the advantageous effects of the present invention.

Although the thickness of the gas barrier layer varies depending on constituent raw materials; however, in the case of an inorganic vapor-deposited film, the thickness is preferably from 1 to 1000 nm, more preferably from 5 to 500 nm, and even more preferably from 10 to 300 nm. Furthermore, in the case where at least one selected from the group consisting of ethylene-vinyl alcohol copolymers and polyamide resins is contained, the thickness is preferably from 2 to 100 μm, more preferably from 5 to 50 μm, even more preferably from 10 to 40 μm, and yet even more preferably from 15 to 30 μm.

The gas barrier layer may be made of one type of raw material or may be made of a plurality of raw materials. In the case where the gas barrier layer is made of a plurality of raw materials, the raw materials may be layered for use, and by using the raw materials layered, even higher barrier effect can be exhibited.

Protective Layer

The oxygen absorbing multi-layer film of the present invention preferably includes a protective layer to protect the gas barrier layer and the oxygen absorbing layer and to improve design.

The protective layer preferably contains a thermoplastic resin as a main component. Examples thereof include: polyolefins such as a polyethylene, polypropylene, polybutene, polybutadiene, polymethylpentene, ethylene-propylene copolymer, and propylene-ethylene block copolymer; polyolefin copolymers such as an ethylene-vinyl acetate copolymer, ethylene-acrylic acid copolymer, ethylene-acrylate copolymer, ethylene-methacrylic acid copolymer, and ethylene-methacrylate copolymer; graft polymers of the above-mentioned polyolefin or the above-mentioned polyolefin copolymer and silicone resin; polyesters such as polyethylene terephthalate; polyamides such as nylon 6 and nylon 6,6; ionomers; and elastomers. One type of these may be used alone, or two or more types of these may be used in combination. Among these, at least one selected from the group consisting of polypropylene resins, polyamide resins, and polyester resins is preferred, at least one selected from the group consisting of polypropylene resins and polyester resins is more preferred, and a polyester resin is even more preferred.

The thickness of the protective layer is not particularly limited and also varies depending on a layer structure of a multi-layer film but is preferably from 2 to 100 μm, more preferably from 5 to 50 μm, even more preferably from 10 to 30 μm, and yet even more preferably from 10 to 20 μm.

Other Layer

In the oxygen absorbing multi-layer film of the present invention, another layer may be included in addition to the layer containing the polyolefin as the main component, the oxygen absorbing layer, the gas barrier layer, and the optional protective layer as described above. Examples of such another layer include an adhesive layer and a printed layer.

The adhesive layer is an optional layer but is preferably provided to adhere layers with adequate strength.

The adhesive layer contains an adhesive resin as a main component.

The adhesive resin is not particularly limited, and a known adhesive thermoplastic resin can be used. Examples thereof include acid-modified polyolefins produced by modifying olefin resins with unsaturated carboxylic acids such as acrylic acid, methacrylic acid, maleic acid, and maleic anhydride. One type of these may be used alone, or two or more types of these may be used in combination. From a viewpoint of adhesiveness, the adhesive resin is preferably an acid-modified polyolefin produced by modifying a resin that is the same as the polyolefin constituting the layers of the oxygen absorbing multi-layer film of the present invention with an unsaturated carboxylic acid.

The printed layer is an optional layer and is preferably provided to improve design of the oxygen absorbing multi-layer film of the present invention and to maintain good appearance even after oxygen is absorbed. Because the oxygen absorbing resin composition constituting the oxygen absorbing layer of the oxygen absorbing multi-layer film of the present invention has excellent light blocking property, the printed layer is preferably provided on an outer face of the oxygen absorbing layer.

When the printed layer is provided, ordinary printing equipment that has been used for printing on known polymer films, such as a gravure printing press, a flexo press, or an offset printing press, and an ordinary method can be applied. Furthermore, also as an ink to form the printed layer, an ink composition that has been used for printing on known polymer films can be employed, and the ink composition is made of an azo-based, phthalocyanine-based, or similar pigment, a resin such as rosin, a polyamide resin, or polyurethane, a solvent such as methanol, ethyl acetate, or methyl ethyl ketone, and the like.

Prior to printing, a surface treatment such as a flame treatment or a corona discharge treatment is preferably performed on a face of the side that is brought into contact with the printed layer so that a uniform printed layer is formed.

Use of Oxygen Absorbing Multi-Layer Film

Because the oxygen absorbing multi-layer film of the present invention includes the oxygen absorbing film as an oxygen absorbing layer, the oxygen absorbing multi-layer film has excellent oxygen absorption property and excellent light blocking property and odor suppressing performance. Thus, the oxygen absorbing multi-layer film is suitably used for a packaging container.

Because the packaging container using the oxygen absorbing multi-layer film of the present invention has excellent oxygen absorption property and excellent light blocking property and odor suppressing performance, the packaging container is suitable for packaging various articles but, in particular, suitable for packaging food.

Examples of the articles to be stored in the packaging container using the oxygen absorbing multi-layer film of the present invention include: beverages, such as milk, milk products, juice, coffee, tea beverages, and alcohol beverages; liquid seasonings, such as Worcester sauce, soy sauce, and dressing; cooked foods, such as soup, stew, curry, infant cooked foods, and nursing care cooked foods; paste foods, such as jam, mayonnaise, ketchup, and jelly; processed seafood, such as tuna and other seafood; processed milk products, such as cheese and butter; processed meat products, such as dressed meat, salami, sausage, and ham; vegetables, such as carrot and potato; egg; noodles; processed rice products, such as uncooked rice, cooked rice, and rice porridge; and dry foods, such as powder seasonings, powder coffee, infant powder milk, powder diet foods, dried vegetables, and rice crackers.

Examples of a form of a packaging container for which the oxygen absorbing multi-layer film of the present invention is suitable include pouches, cover materials, and laminate tubes. Among these, pouches and cover materials are preferred, and cover materials are more preferred.

Cover Material

The cover material of the present invention is made of the oxygen absorbing multi-layer film.

The oxygen absorbing multi-layer film has excellent oxygen absorption property and excellent light blocking property and odor suppressing performance, and thus suitably used for a cover material of a container for food.

The layer structure of the cover material used in the present invention is not particularly limited as long as the layer structure is formed by combining the layers described in the section of "Oxygen Absorbing Multi-Layer Film". When written in the order of the outermost layer to the innermost layer, a layer structure of a protective layer/ printed layer/gas barrier layer/oxygen absorbing layer/polyethylene layer is preferred, and a layer structure of a protective layer (polyester)/printed layer/gas barrier layer (nylon)/oxygen absorbing layer/polyethylene layer or a protective layer (polyamide)/printed layer/gas barrier layer (nylon)/oxygen absorbing layer/polyethylene layer is more preferred.

Examples of the articles to be stored in the container for food, the container including, as a part, the cover material including the oxygen absorbing multi-layer film of the present invention, include: beverages, such as milk, milk products, juice, coffee, tea beverages, and alcohol beverages; liquid seasonings, such as Worcester sauce, soy sauce, and dressing; cooked foods, such as soup, stew, curry, infant cooked foods, and nursing care cooked foods; paste foods, such as jam, mayonnaise, ketchup, and jelly; processed seafood, such as tuna and other seafood; processed milk products, such as cheese and butter; processed meat products, such as dressed meat, salami, sausage, and ham; vegetables, such as carrot and potato; egg; noodles; processed rice products, such as uncooked rice, cooked rice, and rice porridge; and dry foods, such as powder seasonings, powder coffee, infant powder milk, powder diet foods, dried vegetables, and rice crackers.

Among these, when cooked rice is used as an articles to be stored in the container using the cover material of the present invention, a bad odor can be suppressed even during cooking and heating, and because the cover material has an oxygen absorption property and light blocking property, compared to a container using a known cover material, taste and flavor of cooked rice can be significantly enhanced.

EXAMPLES

Hereinafter, the present invention will be described in further detail with reference to examples, but the present invention is not limited to these examples.

Evaluation Methods (1) Amount of Oxygen Absorption

Each of the films produced in Examples and Comparative Examples was cut into a size of 63 mm×76 mm×140 μm and used as a test piece.

The test piece and 500 mL of air were placed in a barrier bag and allowed to stand still in an environment at 25° C. for 7 days. Then, the gas inside of the barrier bag was collected by a syringe, and the oxygen concentration (%) was measured by using an oxygen concentration analyzer (trade name "CheckMate 2", available from Dansensor). The oxygen absorption amount (mL) was calculated based on the oxygen concentration. A larger value of the oxygen absorption amount indicates a superior oxygen absorption performance.

(2) Odor Suppressing Performance 0.5 g of the film each produced in Examples and Comparative Examples was cut out and placed in a petri dish (diameter: 85 mm) and covered with a lid, and heated by a microwave oven (600 W, 20 seconds). Immediately after the heating, the lid was removed, and the odor was evaluated. The odor suppressing performance was evaluated and scored out of 4 (1 to 4) based on the following criteria. A larger numerical value indicates less odor due to a bad odor being suppressed, and indicates a superior odor suppressing performance.

4: Very weak odor. The degree of odor which causes a sense of discomfort, when the odor is smelled carefully.

3: Weak odor. When the odor is smelled for the first time, this smell is not noticed. The degree of odor which can be noticed if this odor is remembered in advance and then smelled carefully.

2: Slightly strong odor. The degree of odor which can be noticed without any attention even when the odor is smelled for the first time.

1: Strong odor. The degree of odor which can be noticed without any attention if food or drink has this odor.

(3) Total Light Transmittance

The film produced in each of Examples and Comparative Examples, the total light transmittance (%) was measured by using Haze Meter NDH4000, available from Nippon Denshoku Industries Co., Ltd. A smaller value of the total light transmittance indicates a superior light blocking property.

(4) Mean Particle Size and Maximum Particle Size

For the mean particle size (D50) of calcium oxide and the mean particle size (D50) and maximum particle size (D90) of iron powder, each of mean particle size at cumulative frequency of 50% (D50) and mean particle size at cumulative frequency of 90% (D90) in volume-based particle size distribution was measured by using a laser diffraction type particle size distribution analyzer "LMS-2000e (trade name)" (available from Seishin Enterprise Co., Ltd.). Note that, as a dispersion medium, isopropyl alcohol (IPA) was used.

Production of Oxygen Absorbing Film

Example 1

Titanium Oxide Master Batch

PEX199094 White AL (master batch of linear low density polyethylene/titanium oxide ($TiO_2$)=40/60 (mass ratio), available from Tokyo Printing Ink Mfg. Co., Ltd.).

Calcium Oxide Master Batch

Using a twin screw kneading extruder having two screws having a diameter of 37 mm, 35 parts by mass of linear low density polyethylene (trade name "KC580S", available from Japan Polyethylene Corporation) and 65 parts by mass of calcium oxide (mean particle size: 5 μm, available from CALFINE Co., Ltd.) were melt-kneaded at 200° C., and a strand was extruded from an extruder head. After cooling, the strand was pelletized, and thus a calcium oxide master batch was produced.

Deoxidant Composition

Iron powder (trade name "sponge iron powder", available from Hoganas Japan K.K.; mean particle size: 30 μm; maximum particle size: 55 μm) was put into a vacuum mixing drier equipped with a heating jacket, and at 130° C. under a reduced pressure of 10 mmHg, 2 parts by mass of an aqueous solution of calcium chloride (calcium chloride/water=1/1 (mass ratio)) with respect to 100 parts by mass of the iron powder was sprayed and dried. Thus, a granular ing resin master batch of Example 1 described above in a manner that the contents of the calcium oxide and the titanium oxide in the oxygen absorbing film became those listed in Table 1. Using the produced oxygen absorbing film, the oxygen absorption amount, the odor suppressing performance, and the total light transmittance were evaluated. The results are shown in Table 1. Note that the content of iron powder in Table 1 was listed as an amount (mass %) including calcium chloride.

TABLE 1

| | Oxygen absorbing resin composition (oxygen absorbing film) | | | | | | Evaluation | | |
|---|---|---|---|---|---|---|---|---|---|
| | Iron powder (mass %) | Titanium oxide (mass %) | Calcium oxide (mass %) | Mass ratio of Titanium oxide/iron powder | Mass ratio of Calcium oxide/iron powder | Mass ratio of Calcium oxide/titanium oxide | Oxygen absorption amount (mL) | Odor suppressing performance | Total light transmittance (%) |
| Comparative Example 1 | 20 | 5 | 0 | 0.25 | 0.00 | 0.00 | 21.1 | 1 | 2.95 |
| Example 2 | 20 | 5 | 2 | 0.25 | 0.10 | 0.40 | 22.2 | 3 | 3.21 |
| Example 1 | 20 | 5 | 4 | 0.25 | 0.20 | 0.80 | 22.2 | 3 | 3.04 |
| Example 3 | 20 | 5 | 6 | 0.25 | 0.30 | 1.20 | 23.4 | 4 | 2.63 |
| Example 4 | 20 | 5 | 8 | 0.25 | 0.40 | 1.60 | 21.1 | 4 | 2.51 |
| Comparative Example 2 | 20 | 5 | 12 | 0.25 | 0.60 | 2.40 | 15.8 | 4 | 2.54 |
| Comparative Example 3 | 20 | 5 | 14 | 0.25 | 0.70 | 2.80 | 13.5 | 4 | 2.14 |
| Comparative Example 4 | 20 | 5 | 16 | 0.25 | 0.80 | 3.20 | 10.5 | 4 | 1.83 |
| Comparative Example 5 | 20 | 5 | 1 | 0.25 | 0.05 | 0.20 | 21.7 | 1 | 3.63 |
| Comparative Example 6 | 20 | 1 | 5 | 0.05 | 0.25 | 5.00 | 22.8 | 4 | 14.15 |
| Comparative Example 7 | 20 | 15 | 5 | 0.75 | 0.25 | 0.33 | 16.4 | 4 | 0.51 | deoxidant composition in which the calcium chloride was attached to the iron powder surface was prepared.

Oxygen Absorbing Resin Master Batch

Using the twin screw kneading extruder described above, 20.8 parts by mass of the titanium oxide master batch, 15 parts by mass of the calcium oxide master batch, 50 parts by mass of the deoxidant composition, and 14.2 parts by mass of linear low density polyethylene (trade name "KC580S", available from Japan Polyethylene Corporation) were melt-kneaded at 200° C., and a strand was extruded from an extruder head. After cooling, the strand was pelletized, and thus an oxygen absorbing resin master batch was produced.

Production of Oxygen Absorbing Film

Then, 40 parts by mass of the oxygen absorbing resin master batch and 60 parts by mass of linear low density polyethylene (trade name "KC580S", available from Japan Polyethylene Corporation) were dry-blended and pressed in a pressing condition at 200° C. by using a hydraulic pressing machine. Thus, an oxygen absorbing film containing the oxygen absorbing resin composition (thickness: 140 μm) was produced. Using the produced oxygen absorbing film, the oxygen absorption amount, the odor suppressing performance, and the total light transmittance were evaluated. The results are shown in Table 1.

Examples 2 to 4 and Comparative Examples 1 to 7

Each oxygen absorbing film (thickness: 140 μm) was produced in the same manner as in Example 1 except for adjusting the amounts of the titanium oxide master batch, the calcium oxide master batch, and the linear low density polyethylene at the time of production of the oxygen absorb- As can be seen from the results shown in Table 1, the oxygen absorbing film containing the oxygen absorbing resin composition of the present invention had a large oxygen absorption amount, excellent oxygen absorption property, low total light transmittance, excellent light blocking property, and excellent odor suppressing performance

The invention claimed is:

1. An oxygen absorbing resin composition comprising:
a linear low density polyethylene;
an iron powder having a metal iron content of 95 mass % or more;
titanium oxide; and
calcium oxide,
a content of the iron powder being from 18 to 25 mass % in the oxygen absorbing resin composition,
a mass ratio of the titanium oxide to the iron powder [titanium oxide/iron powder] being from 0.2 to 0.3,
a mass ratio of the calcium oxide to the iron powder [calcium oxide/iron powder] being from 0.1 to 0.5, and
a mass ratio of the calcium oxide to the titanium oxide [calcium oxide/titanium oxide] being from 0.4 to 1.6,
wherein the iron powder is at least one selected from the group consisting of reduced iron powder, sponge iron powder, sprayed iron powder, iron grinding powder, electrolytic iron powder, and crushed iron.

2. The oxygen absorbing resin composition according to claim 1, wherein the mass ratio of the titanium oxide to the iron powder [titanium oxide/iron powder] is 0.25.

3. The oxygen absorbing resin composition according to claim 1, wherein a mass ratio of the calcium oxide to the titanium oxide [calcium oxide/titanium oxide] is from 0.6 to 1.5.

4. The oxygen absorbing resin composition according to claim 1, wherein a content of the titanium oxide is from 1 to 15 mass % in the oxygen absorbing resin composition.

5. The oxygen absorbing resin composition according to claim 1, wherein a content of the calcium oxide is from 1 to 15 mass % in the oxygen absorbing resin composition.

6. An oxygen absorbing film comprising the oxygen absorbing resin composition according to claim 1.

7. An oxygen absorbing multi-layer film comprising the oxygen absorbing film according to claim 6 as an oxygen absorbing layer.

8. The oxygen absorbing multi-layer film according to claim 7, comprising a multi-layer structure including a layer containing a polyolefin as a main component, the oxygen absorbing layer, and a gas barrier layer layered in this order.

9. The oxygen absorbing multi-layer film according to claim 8, wherein the gas barrier layer is a layer containing at least one selected from the group consisting of thin metal films, inorganic vapor-deposited films, ethylene-vinyl alcohol copolymers, and polyamide resins.

10. The oxygen absorbing multi-layer film according to claim 7, wherein a thickness of the oxygen absorbing layer is from 10 to 200 μm.

11. The oxygen absorbing multi-layer film according to claim 7, wherein the titanium oxide is only contained in the oxygen absorbing layer.

12. A cover material comprising the oxygen absorbing multi-layer film according to claim 7.

13. The oxygen absorbing resin composition according to claim 1, wherein the oxygen absorbing resin composition contains a metal halide.

\* \* \* \* \*